(12) United States Patent
Gschwind et al.

(10) Patent No.: US 9,997,050 B2
(45) Date of Patent: Jun. 12, 2018

(54) TRACKING A USER BASED ON AN ELECTRONIC NOISE PROFILE

(71) Applicant: INTERNATIONAL BUSINESS MACHINES CORPORATION, Armonk, NY (US)

(72) Inventors: Michael Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 14/985,556

(22) Filed: Dec. 31, 2015

(65) Prior Publication Data
US 2017/0193797 A1 Jul. 6, 2017

(51) Int. Cl.
*G08B 1/08* (2006.01)
*G08B 21/24* (2006.01)
*H04W 4/02* (2018.01)

(52) U.S. Cl.
CPC .............. *G08B 21/24* (2013.01); *H04W 4/02* (2013.01)

(58) Field of Classification Search
CPC combination set(s) only.
See application file for complete search history.

(56) References Cited

U.S. PATENT DOCUMENTS

| | | | |
|---|---|---|---|
| 2008/0081562 A1* | 4/2008 | Nagata | H04W 8/186 455/41.2 |
| 2011/0084807 A1* | 4/2011 | Logan | H04Q 9/00 340/10.1 |
| 2012/0293341 A1* | 11/2012 | Lin | B60R 25/00 340/901 |
| 2013/0154819 A1* | 6/2013 | Stefanovski | B60R 25/24 340/457 |

FOREIGN PATENT DOCUMENTS

| | | |
|---|---|---|
| CN | 101471703 | 7/2009 |
| CN | 101854608 | 10/2010 |
| CN | 202641565 | 1/2013 |

* cited by examiner

*Primary Examiner* — Travis Hunnings
(74) *Attorney, Agent, or Firm* — F. Chau & Associates, LLC (57) ABSTRACT

An electronic device includes a device code, a processor, a wireless protocol transceiver, a motion detector, an alarm and a state machine. The electronic device has a device code associated with an owner. The electronic device's wireless protocol transceiver establishes a communication link with another wireless protocol transceiver associated with the owner. The motion detector detects movement of the electronic device. The state machine, operated by the processor, may stay at a first state or advance to a second state based on signals received from the wireless protocol transceiver and the motion detector. The second state signifies a reminder condition and upon arriving at the second state, the alarm is activated.

14 Claims, 4 Drawing Sheets

TRACKING A USER BASED ON AN ELECTRONIC NOISE PROFILE

TECHNICAL FIELD

The present invention relates to a system for tracking a user and more specifically to tracking a user's location relative to a device based on the user's electronic noise profile.

DISCUSSION OF RELATED ART

Users may carry many different mobile devices. It is common for a user to forget or misplace a mobile device. A reactive method for finding a mobile device, e.g. calling a mobile phone, may only occur after a user notices the device is lost and the mobile device may not be in an easily reachable area. An active method for tracking the user's location relative to the mobile devices and to alert the user if they are about to forget their mobile device may be desirable.

SUMMARY

The present disclosure provides a tracking system to alert a user when the user forgets a mobile device and method for the same.

According to an exemplary embodiment, an electronic device includes a device code, a processor, a memory, a state detector, an alarm and a state machine. The electronic device has a device code associated with an owner. The memory stores an electronic noise profile associated with the owner. The state detector detects electronic noise proximal to the owner. The state machine, operated by the processor, may stay at a first state or advance to a second state based on signals received from the state detector signifying a departure from the electronic noise profile. The second state signifies a reminder condition and upon arriving at the second state, the alarm is activated.

According to an exemplary embodiment, an electronic device includes a device code, a processor, a wireless protocol transceiver, a motion detector, an alarm, a user profile database and a state machine. The electronic device has a device code associated with an owner. The electronic device's wireless protocol transceiver establishes a communication link with another wireless protocol transceiver=enabled device associated with the owner. The motion detector detects movement of the electronic device. The user profile database stores an owner's electronic noise profile. The state machine, operated by the processor, may stay at a first state or advance to a second state based on a comparison between signals received from the wireless protocol transceiver and the motion detector and the owner's electronic noise profile. The second state signifies a reminder condition and upon arriving at the second state, the alarm is activated.

According to an exemplary embodiment, an electronic device includes a device code, a processor, a wireless protocol transceiver, a light detector, an alarm and a state machine. The electronic device has a device code associated with an owner. The wireless protocol transceiver establishes a communication link with another wireless protocol transceiver associated with the owner. The light detector detects the presence of light. The state machine, having device codes executed by the processor may operate to stay at a first state or advance to a second state based on signals received from the wireless protocol transceiver and the light detector. The second state signifies a reminder condition and upon arriving at the second state, the alarm is activated.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention.

DETAILED DESCRIPTION

In a reactive approach to locating a mobile device, a user notices that a mobile device is missing and then attempts to locate the device. Locating the device may include calling the mobile phone or manually searching an area. In this approach the mobile device is already lost and time and effort must be spent to locate it. Also, the mobile device may be left at a different location, for example at home or at a store, which makes retrieving the mobile device difficult.

According to an exemplary embodiment, a mobile device may actively track a user and alert the user before the mobile device is forgotten. The mobile device may gather the electronic noise associated with the user. A tracking system may generate an electronic noise profile of the user based on the gathered electronic noise associated with the user. The mobile device, operating in conjunction with the tracking system, may track the movements of the user and alert the user when the tracking system determines the user is about to leave the proximity of the mobile device.

Figure 1:
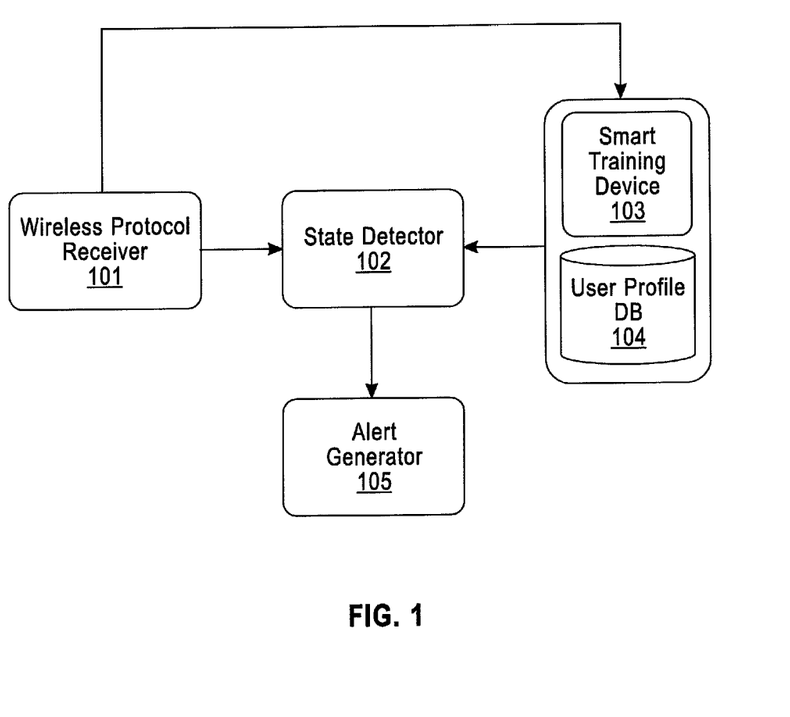
FIG. 1 is a schematic block diagram illustrating an exemplary embodiment of the invention.

FIG. 1 illustrates an exemplary system for tracking the proximity of a user relative to a mobile device.

According to an exemplary embodiment, a mobile device, including a wireless protocol transceiver 101, may detect electronic noise associated with the user by receiving a wireless signal and decoding information contained in the signal set forth in a protocol. The electronic noise is made of wireless signals output by a plurality of wireless devices. The plurality of wireless devices may be associated with the user's person. The plurality of wireless devices may also be associated with a vehicle or a plurality of locations associated with the user. For example, the electronic noise may be a Bluetooth signal, a WiFi signal or a similar wireless signal associated with a person, vehicle or location. The mobile device, including the wireless protocol transceiver 101, e.g., a state detector. The mobile device may include a device code that identifies the mobile device and may be associated with the user.

The Bluetooth signals may be associated with one or more devices associated with the user. For example, a Bluetooth signal may be gathered from a user's wearable devices including a Bluetooth headset or a smart watch. The Bluetooth signal may also be gathered from stationary devices such as Bluetooth speakers, keyboards, mice, computers, vehicles and any devices belonging to the internet of things. The wireless protocol transceiver 101 may be a WiFi radio, a cellular radio or a similar wireless radio. The wireless protocol transceiver 101 may also track the user based on nearby WiFi networks such as a home network, office network or network at a store or other business establishment. The wireless protocol transceiver 101 may also use other WiFi devices to track the user including other mobile devices, computers and vehicles.

A smart training device 103 may include one or more processors to collect substantially all the electronic noise associated with the user and generate an electronic noise profile. The processor may be one or more central processing units CPUs or graphical processing units GPUs. The smart training device 103 may include sensors to collect a location, a direction, a speed, a time, a date, an ambient level of sound and an ambient level of light at the time the wireless protocol transceiver 101 receives the electronic noise. The smart training device 103 may store the electronic noise and associated data in a user profile database 104. The smart training device 103 may include generic rules from a server or other database when initially constructing a user's electronic noise profile or when the smart training device 103 determines the generic rule may complement information gathered by the tracking system.

The electronic noise profile includes a list of electronic noise, user behaviors and other data associated with the user. Over time the smart training device 103 may collect a number of records and determine the behavioral patterns of the user using machine learning.

The smart training device 103 may use a machine learning technology, such as deep learning, to identify patterns of a user. Deep learning uses many layers of nonlinear processing units to extract features from data. Each successive layer uses the information derived from the previous layer to extract increasingly complex info' cation. The deep learning process may be supervised or un-supervised. Deep learning may be used to determine the patterns of a user associated with the mobile device. For example, the early layers of a smart training device 103 using deep learning may be able to associate the electronic noise around a user's mobile device with a location and time. Successive layers may combine these observations to generate one or more routes the user typically takes on a schedule. This information is included in the user's electronic noise profile. In at least one embodiment, the noise profile may correspond to the signals of a headset, smart watch or other wearable devices associated with the user.

A state detector 102 may include one or more processors to compare the electronic noise received by the wireless protocol transceiver 101. The state detector 102 may determine if the user is about to leave the proximity of the mobile device. The state detector 102 may receive electronic noise from the wireless protocol transceiver 101 and a user's electronic noise profile from the user profile database 104. The state detector 102 compares the received electronic noise with the user's electronic noise information and behavioral pattern from the user's electronic noise profile. The state detector 102 may determine if the user is about to leave the proximity of the mobile device when there is a deviation from the user's behavior included in the user's electronic noise profile. In an exemplary embodiment, a difference between the electronic noise profile and the received electronic noise may be the loss of a connection with a wearable device associated with the user, e.g. a head set, a Bluetooth implant, a smart watch, medical tracking device or other wearable devices. In an exemplary embodiment, an alert is established if signal strength falls below a selected threshold, but the connection is still maintained, to allow use of said connection to alert the user.

An alert generator 105 may include one or more processors to alert the user that the user is about to leave the proximity of the mobile device upon receiving an instruction from the state detector 102. The alert generator 105 may use one or more different methods to alert a user leaving the proximity of the mobile device. The alert generator 105 may cause the mobile device to emit a sound to alert the user, e.g. a ringtone. For example, a distinctive ringtone with a maximal volume will be used. The alert generator 105 may alert the user through an indication in a Bluetooth headset or a wearable device. The indication may include an audible warning, a visual warning or a tactile warning. The alert generator 105 may also contact another user trusted by the owner of the device. The other trusted user may then warn the owner of the device that the owner is about leave the proximity of the mobile device. The alert generator 105 may also alert a user with the user's own vehicle. For example, a user's vehicle may flash its light or honk a horn. The alert generator 105 may use one or more different alerts in combination based on the type of deviation from the user's electronic noise profile. For example, if the user forgets the mobile device at home before leaving for work the alert generator 105 may send an alert to the user Bluetooth headset and the user's wireless equipped vehicle. If the user forgets the mobile device at the gym the mobile device may alert with gym staff or the user's gym partner.

In an exemplary embodiment, when the connection to a user's Bluetooth device has been lost, a device may increase transmitter strength and reception sensitivity (e.g., incoming signal amplification) to reestablish a connection over which to alert a user. A protocol may support a unidirectional alert function, wherein it is sufficient for a transmitter to transmit an alert beam to trigger an indication of an alert. A mobile device often has a stronger radio connection with a wearable device enabling it to send a signal that may reach a wearable device when a primary connection has been lost. Further, since little information needs to be transmitted, a signaling sequence with greater range and less bandwidth may be used by an alert beacon to transmit a small amount of information including the indication of an alert.

Figure 2:
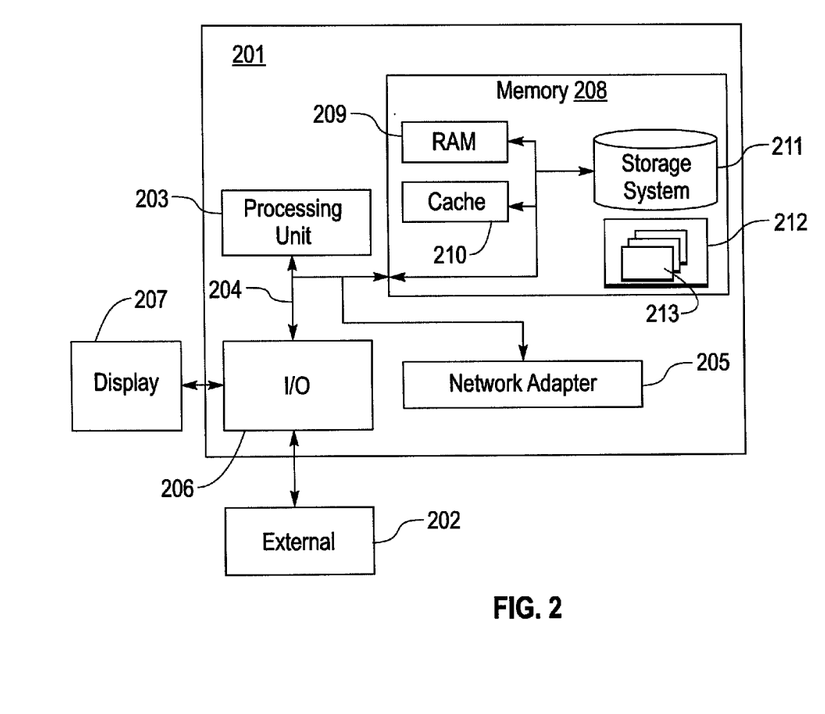
FIG. 2 is a schematic block diagram block diagram illustrating a computer system to implement an embodiment of the invention.

FIG. 2 illustrates an exemplary computer system/server 201, which is applicable to implementing the tracking system. The tracking system may be implemented in a mobile device, e.g. a computer system, or a remote computer server. The computer system/server 201 is only illustrative and is not intended to suggest any limitation as to the scope of use or functionality of embodiments of the invention described herein.

As shown in FIG. 2, the computer system/server 201 is shown in the form of a general-purpose computing device. The components of the computer system/server 201 may include, but are not limited to, one or more processors or processing units 203, a system memory 208, and a bus 204 that couples various system components including system memory 208 to processor 203. The processor may include an application specific integrated circuit ("ASIC"), a programmable gate array ("PGA"), a field programmable gate array ("FPGA"), etc.

Bus 204 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 201 may include a variety of computer system readable media. Such media may be any available media that is accessible by the computer system/server 201, and it includes both volatile and non-volatile media, removable and non-removable media.

The system memory 208 can include computer system readable media in the form of volatile memory, such as random access memory (RAM) 209 and/or cache memory 210. The computer system/server 201 may further include other removable/non-removable, volatile/non-volatile computer system storage media. By way of example, storage system 211 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 204 by one or more data media interfaces. As will be further depicted and described below, memory 208 may include at least one program product having a set (e.g., at least one) of program modules that are configured to carry out the functions of embodiments of the invention.

A program/utility 212, having a set (at least one) of program modules 213, may be stored in memory 208 by way of example, and not limitation, as well as an operating system, one or more application programs, other program modules, and program data. Each of the operating system, one or more application programs, other program modules, and program data or some combination thereof, may include an implementation of a networking environment. The program modules 213 generally carry out the functions and/or methodologies of embodiments of the invention as described herein.

The computer system/server 201 may also communicate with one or more external devices 202 such as a keyboard, a pointing device, a display 207, etc.; one or more devices that enable a user to interact with the computer system/server 201; and/or any devices (e.g., network card, modem, etc.) that enable the computer system/server 201 to communicate with one or more other computing devices. Such communication can occur via Input/Output (I/O) interfaces 206. The computer system/server 201 can communicate with one or more networks such as a local area network (LAN), a general wide area network (WAN), and/or a public network (e.g., the Internet) via a network adapter 205. As depicted, the network adapter 205 communicates with the other components of computer system/server 201 via the bus 204. It should be understood that although not shown, other hardware and/or software components could be used in conjunction with the computer system/server 201. Examples of these other hardware and/or software components include, but are not limited to: microcode, device drivers, redundant processing units, external disk drive arrays, RAID systems, tape drives, and data archival storage systems.

Figure 3:
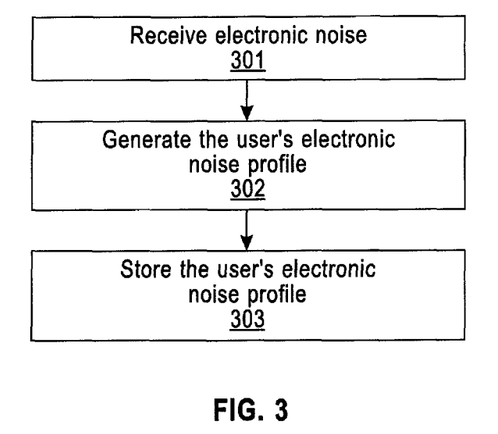
FIG. 3 is a flow chart illustrating the operation of an exemplary embodiment of the invention.

FIG. 3 illustrates an exemplary method for training a system to recognize a user's electronic noise profile.

Referring to FIG. 1, the wireless protocol transceiver 101 samples the electronic noise and receives electronic noise associated with the user (step 301). For example, the wireless protocol transceiver 101 may receive electronic noise from a user's Bluetooth headset, Bluetooth equipped vehicle or a Bluetooth equipped medical device, e.g. a pacemaker. Noise sampling may be triggered when a user configures and/or couple a new Bluetooth capable or other wireless device to the mobile device.

The smart training device 103 derives the user's electronic noise profile from the received the electronic noise (step 302). The smart training device 103 may receive electronic noise associated with one or more sources. For example, the smart training device 103 may receive an electronic noise from a user's Bluetooth headset and a user's Bluetooth equipped vehicle.

The user profile database 104 stores the user's electronic noise profile (step 303). The user profile database 104 may store the user's electronic noise profile locally on the mobile device, at a remote database or at a cloud service.

Figure 4:
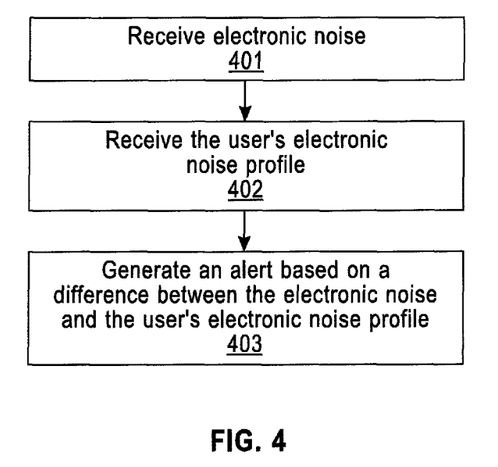
FIG. 4 is a flow chart illustrating the operation of an exemplary embodiment of the invention.

FIG. 4 illustrates an exemplary method for alerting a user that is about to leave the area proximate to the mobile device.

Referring to FIG. 1, the state detector 102 receives electronic noise data from the wireless protocol transceiver 101 (step 401). The smart training device 103 may receive electronic noise from one or more sources. For example, the smart training device 103 may receive an electronic noise from a user's Bluetooth headset and a user's Bluetooth equipped vehicle.

The state detector 102 receives the user's electronic noise profile from the user profile database 104 (step 402). For example, the state detector 102 may load the user's electronic noise profile from a locally stored user profile database 104 over a local bus. The state detector 102 may also load the user's electronic noise profile from a remotely stored user profile database 104. In this example, the state detector 102 may receive the user profile database 104 through a cellular network. The user profile database 104 may transmit an updated electronic noise profile to the state detector 102 when an update to the electronic profile is detected. In an exemplary embodiment, the state detector 102 may periodically poll the user profile database 104 and check for an updated user electronic profile. If an updated user electronic profile is detected the state detector 102 receives the updated user electronic profile.

The alert generator 105 receives an alert notification from the state detector 102 if electronic noise received by the wireless protocol transceiver 101 does not substantially match the user's electronic noise profile (step 403). When the electronic noise detected by the wire receiver 101 does not substantially match the user's electronic noise profile the state detector 102 alerts the alert generator 105. The alert generator 105 may send the alert to a device that may be in the user's possession or to another user that may be able to contact the user of the mobile device.

In an exemplary embodiment, some or all of the tracking system may be implemented in a remote server or a cloud computing environment. The wireless protocol transceiver 101 is implemented in the mobile device to determine the electronic noise in the immediate environment around the mobile device. Some or all of the state detector 102, the smart training device 103, the user profile database 104 and the alert generator 105 may be implemented in the mobile device, a remote server or a cloud computing environment. For example, the mobile device may transmit the electronic noise information to a cloud service including the state detector 102, the smart training device 103, the user profile database 104 and the alert generator 105. The cloud service may generate the alert signal based on the electronic noise and transmit the alert signal to any relevant alert device.

In an exemplary embodiment, the remote server or cloud based model may also allow the user's other devices to share the tracking system. For example, when the user profile database 104 is implemented on a remote server or cloud based service then multiple devices can access the same user electronic noise profile. Additionally, some mobile devices where processing power and/or batter life may be a concern may move the more intensive processing tasks associated with the state detector 102, the smart training device 103, the user profile database 104 and the alert generator 105 to a remote server or cloud based service.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
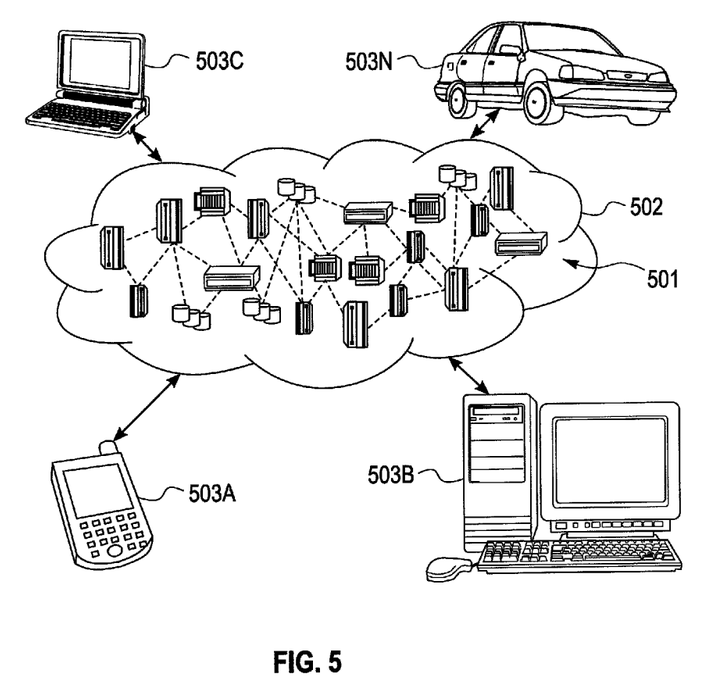
FIG. 5 illustrates a cloud computing environment according to an embodiment of the present invention.

Referring now to FIG. 5, illustrative cloud computing environment 502 is depicted. As shown, cloud computing environment 502 comprises one or more cloud computing nodes 501 with which local computing devices used by cloud consumers, such as, for example, personal digital assistant (PDA) or cellular telephone 503A, desktop computer 503B, laptop computer 503C, and/or automobile computer system 503N may communicate. Nodes 501 may communicate with one another. They may be grouped (not shown) physically or virtually, in one or more networks, such as Private, Community, Public, or Hybrid clouds as described hereinabove, or a combination thereof. This allows cloud computing environment 502 to offer infrastructure, platforms and/or software as services for which a cloud consumer does not need to maintain resources on a local computing device. It is understood that the types of computing devices 503A-N shown in FIG. 5 are intended to be illustrative only and that computing nodes 501 and cloud computing environment 502 can communicate with any type of computerized device over any type of network and/or network addressable connection (e.g., using a web browser).

According to an exemplary embodiment, a user may be alerted if a mobile device is left in a car by a tracking system. A smart training device 103 may generate an electronic noise profile based on a user's wireless transmitter equipped vehicle, e.g. a car, and/or a smart wearable device. The wireless transmitter equipped vehicle may use Bluetooth, a WiFi communication link or a similar wireless technology. In addition to the electronic noise the user's electronic noise profile may include information from other sensors on the mobile device.

Additional information may be recorded by auxiliary devices to determine the behavior of the user. For example, vibrations detected by an accelerometer in the mobile device may indicate that the vehicle is still on. A lack a vibration from the accelerometer may indicate that the vehicle is off. Other indicators may include an accelerator to detect changes in the velocity of the vehicle, GPS to determine the location, speed and route of the vehicle and a clock to determine the user's schedule.

During a drive a wireless protocol transceiver 101 in a user's mobile device may detect the user's Bluetooth or WiFi communication link with the Bluetooth or WiFi equipped car and Bluetooth equipped smart wearable device. The car's Bluetooth or WiFi transmitter may activate when the car is turned on. This electronic noise and the other sensor data, e.g. the accelerometer indicating that the mobile device is vibrating, are compared to the user's electronic noise profile. If the detected information substantially corresponds to the user's electronic noise profile the state detector 102 enters a first state and continues to monitor the information received from the mobile device. If the detected information no longer substantially corresponds to the user's electronic noise profile the state detector 102 enters a second state. In the second state the state detector 102 sends an alert signal to the alert generator 105. Upon receiving the alert signal, the alert generator 105 will try to alert the user that the user is leaving the proximity of the mobile device. This may be done by sending a message to a Bluetooth headset or a wearable device on the user's person, the mobile device may attempt to alert the user by an audio or visual signal or the mobile device may cause the car's alarm system to activate. The mobile device may attempt to alert the user by activating a ringtone, a loud sound, a blinking light, vibrating or any combination of similar alerts. The car's alarm system may include repeated use of the car's horn, headlights and other audio and visual alarms.

In an exemplary embodiment, during a first state an accelerometer, e.g. a motion detector, in the mobile device monitors for motion consistent with a moving vehicle. After the state detector 102 moves from the first state to a second state the monitoring of the accelerator continues. In this second state the accelerator is monitored for movements that are consistent with a person moving. This may indicate that the mobile device is being carried by the user and was not forgotten in the vehicle. In this second state, the state detector 102 may continue to monitor the plurality of sensors for inconsistencies with the user's electronic noise profile to avoid entering a third state. If the accelerometer in the second state does not indicate movements consistent with a person moving and the electronic noise is substantially inconsistent with the user's electronic noise profile the state detector 102 may advance to a third state and send an alert signal to the alert generator 105. The operation of the alert generator 105 after receiving an alert signal has been described above.

In an exemplary embodiment, in the first state the state detector 102 may receive information from a light detector included in the mobile device. The state detector 102 may stay in a first state if the light detector indicates light. Detecting light is indicative of the device being inside the car. After the state detector 102 moves out of the first state into a second state the light detector is monitored. In this second state, if the light detector detects darkness the state detector 102 stays in this second state. In this state detecting darkness may be indicative of the mobile device being carried in a pocket or purse of the user. If the light detector detects light and the electronic noise is substantially inconsistent with the user's electronic noise profile it may be indicative of the mobile device being forgotten in a vehicle and the state detector 102 may advance to a third state. In this third state the state detector 102 may send an alert signal to the alert generator 105. The operation of the alert generator 105 after receiving an alert signal has been described above.

In an exemplary embodiment, the location of the mobile device is tracked via GPS. The location of the mobile device is tracked via GPS and compared to a route and schedule stored in the user's electronic noise profile. The state detector 102 stays in a first state as long as the location of the mobile device, as determined by the GPS, substantially corresponds to a route and schedule associated with a first state. The state detector 102 may advance to a second state when the location detected by the GPS and the electronic noise information substantially deviate from the route and schedule associated with the first state. The location of the mobile device may be determined through other devices including locating the mobile device relative to cellular phone tower and/or a WiFi access points. The state detector 102 may account for known traffic hazards and road closings when determining if the user substantially deviates from the route and schedule. In this second state the state detector 102 may send an alert signal to the alert generator 105 indicating that the phone is forgotten. The operation of the alert generator 105 after receiving an alert signal has been described above.

In an exemplary embodiment, the velocity of the mobile device is tracked via GPS. The velocity of the mobile device is tracked via GPS and compared to a stored series of velocities in the user's electronic noise profile. The state detector 102 stays in a first state as long as the velocity of the mobile device, as determined by the GPS, substantially corresponds to a series of velocities associated with a first state. For example, a high speed when the user is scheduled to be in the vehicle or a low speed when the user is scheduled not to be in the vehicle would be consistent with the user's electronic noise profile. However, a low speed or no velocity when the user is scheduled to be in the vehicle would be inconsistent with the user's electronic noise profile. For example, when the velocity of the mobile device is greater than 10 MPH, which is not compatible with a pedestrian, and less than 250 MPH, which is not compatible with a plane, the mobile device may assume it is being carried in a car. The state detector 102 may advance to a second state when the velocities detected by the GPS and the electronic noise information deviates from the series of velocities associated with the first state. In this second state the state detector 102 may send an alert signal to the alert generator 105. The operation of the alert generator 105 after receiving an alert signal has been described above.

In an exemplary embodiment, the tracking system may include some or all of the accelerator, the light detector, the GPS and other factors not previously disclosed.

According to an exemplary embodiment, a user may be alerted if a mobile device is left at a location by a tracking system. A smart training device 103 may generate an electronic noise profile based on the electronic noise associated with a location. The electronic noise associated with a location may include the signal from one or more wireless access points, other mobile devices, computers and internet of things devices. The wireless access points may use Bluetooth, WiFi or a similar wireless technology. The wireless access points may or may not be controlled by the user. In addition to the electronic noise the user's electronic noise profile may include information from other sensors on the mobile device.

Additional information may be recorded to determine the behavior of the user. For example, vibrations detected by an accelerometer in the mobile device may indicate that the user is moving. This information may be combined with time and date information to infer a user's schedule. Other indicators may include an accelerator to detect changes in the velocity, GPS to determine the location, speed and route of the user and a clock to determine the user's schedule.

While at a location, the wireless protocol transceiver 101 in a user's mobile device may detect electronic noise from one or more wireless access points, other mobile devices, computers and internet of things devices associated with a location. If the detected electronic noise at a time and date substantially corresponds to the user's electronic noise profile the state detector 102 enters a first state and continues to monitor the information received from the mobile device. If the electronic noise at a time and date no longer substantially corresponds to the user's electronic noise profile the state detector 102 enters a second state. In the second state the state detector 102 sends an alert signal to the alert generator 105. Upon receiving the alert signal, the alert generator 105 will try to alert the user that the mobile device may have been forgotten at a location. This may be done by sending a message to a Bluetooth headset or a wearable device on the user's person, the mobile device may attempt to alert the user by an audio or visual signal or the mobile device may cause the car's alarm system to activate. The mobile device may attempt to alert the user by activating a ringtone, a loud sound, a blinking light, vibrating or any combination of similar alerts.

In an exemplary embodiment, in the first state the state detector 102 may receive information from a light detector included in the mobile device. The state detector 102 may stay in a first state if the light detector indicates light. Detecting light is indicative of the device being inside the location. After the state detector 102 moves out of the first state into a second state the light detector is monitored. In this second state, if the light detector detects darkness the state detector 102 stays in this second state. In this state detecting darkness may be indicative of the mobile device being carried in a pocket or purse of the user. If the light detector detects light and the electronic noise is substantially inconsistent with the user's electronic noise profile it may be indicative of the mobile device remaining in the location and the state detector 102 may advance to a third state. In this third state the state detector 102 may send an alert signal to the alert generator 105. The operation of the alert generator 105 after receiving an alert signal has been described above.

In an exemplary embodiment, the tracking system may include some or all of the accelerator, the light detector, the GPS and other factors not previously disclosed.

In an exemplary embodiment, a first state corresponds to the mobile device being connected to a headset proximate to the user, or in receipt of electronic noise of a headset proximate to the user when the mobile device is not connected to the headset. The state detector may enter a second state when the headset disconnects, or the headset's electronic noise changes or disappears. The transition to the second state may also be based on the mobile device's accelerometer not detecting motion. When the second state is entered an alarm may be triggered.

In an exemplary embodiment, escalating multimodal alarm mechanisms may be employed. For example the escalating multimodal alarm may include an attempt to establish a connection to a user's headset or other wearable device to transmit an alarm. Further mechanisms of the escalating multimodal alarm may include increasing transmitter power, increasing receiver sensitivity, and using a protocol with longer reach, even if the protocol is known to have lower data performance or other undesirable aspects for operational payload data transmission use. An alarm beacon function of a protocol in accordance with the present invention may also be used. Some or all of the exemplary mechanisms of the escalating multimodal alarm may be used in a different order than in the above example.

In an exemplary embodiment, when a connection to a wearable device is not successful, device-based alert mechanisms may be used including audiovisual effects, e.g., flashing of an LED flash, flashing of a screen, device vibration, and use of one or more ringtones. More than one of the exemplary mechanisms above may be used concurrently, and with escalating intensity, e.g., increasing flash duration, flash strength, ringtone volume, and so forth.

In an exemplary embodiment, when a device based notification is not possible other mechanisms may be used, e.g., the mobile device may instruct a proxy to signal an alarm. For example, a car may act as proxy and honk a car horn, flash lights, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been described in detail with reference to exemplary embodiments, those skilled in the art will appreciate that various modifications and substitutions can be made thereto without departing from the spirit and scope of the invention as set forth in the appended claims.

We claim:

1. An electronic device, comprising:
   a device code associated with an owner;
   a processor;
   a memory stored with an electronic noise profile of the owner, wherein the electronic noise profile includes a plurality of wireless signals associated with a plurality of locations and time of day information;

a state detector that detects electronic noise proximal to the owner, wherein the electronic noise includes a first wireless signal associated with a location and time of day information;
an alarm;
a state machine operated by the processor, the state machine is configured to stay at a first state or advance to a second state based on signals received from the state detector signifying a departure from the electronic noise profile, wherein the first wireless signal and the location and time of day information associated with the first wireless signal is respectively different from the plurality of wireless signals and the locations and time of day information associated with the plurality of wireless signals, the state machine advances to the second state, wherein the second state signifies a reminder condition and upon arriving at the second state, the alarm is activated.

2. The electronic device of claim 1, wherein the electronic noise profile includes a learned pattern of travel in combination with time of day information.

3. The electronic device of claim 1, wherein the state detector is configured to receive a wireless signal from a wireless protocol transceiver, the wireless signal is at least one of a Bluetooth or wifi signal.

4. The electronic device of claim 1, further comprising an auxiliary device, wherein the state machine is configured to stay at the first state or advance to the second state based on the signals received from the state detector signifying the departure from the electronic noise profile and the auxiliary device.

5. The electronic device of claim 4, wherein the auxiliary device includes at least one of a GPS location device, a motion detector and a light detector.

6. An electronic device, comprising:
a device code associated with an owner;
a processor;
a wireless protocol transceiver that establishes a communication link with another wireless protocol transceiver associated with the owner;
a light detector to detect light;
a motion detector that detects movement of the electronic device;
an alarm;
a user profile database to store an owner's electronic noise profile; and
a state machine operated by the processor, the state machine is configured to enter a first state, a second state or a third state, wherein when the light detector detects light, the state machine is in the first state, and when the light detector detects darkness, the state machine is in the second state, wherein the state machine advances from the first state to the third state when light is still detected and signals received from the wireless protocol transceiver and the motion detector are different from that of the owner's electronic noise profile, wherein the third state signifies a reminder condition and upon arriving at the third state, the alarm is activated.

7. The electronic device of claim 6, wherein the third state arrives when the wireless protocol transceiver signals a communication link disconnect condition and the motion detector signals a no-movement condition.

8. The electronic device of claim 6, wherein the another wireless protocol transceiver is embedded in a vehicle, and the communication link is established when the vehicle is started.

9. The electronic device of claim 6, wherein the another wireless protocol transceiver is embedded in a smart wearable device.

10. The electronic device of claim 9, wherein the processor sends a message to the smart wearable device to signal the arrival of the third state to activate an alarm condition.

11. The electronic device of claim 10, wherein the smart wearable device in turn activates an alarm embedded in a proxy device.

12. The electronic device of claim 6, wherein the wireless protocol transceiver and the state machine are embedded in a mobile device.

13. The electronic device of claim 6, wherein the state machine is embedded in a remote server.

14. The electronic device of claim 6, wherein the state machine is embedded in a cloud server.

* * * * *